Patented Dec. 30, 1924.

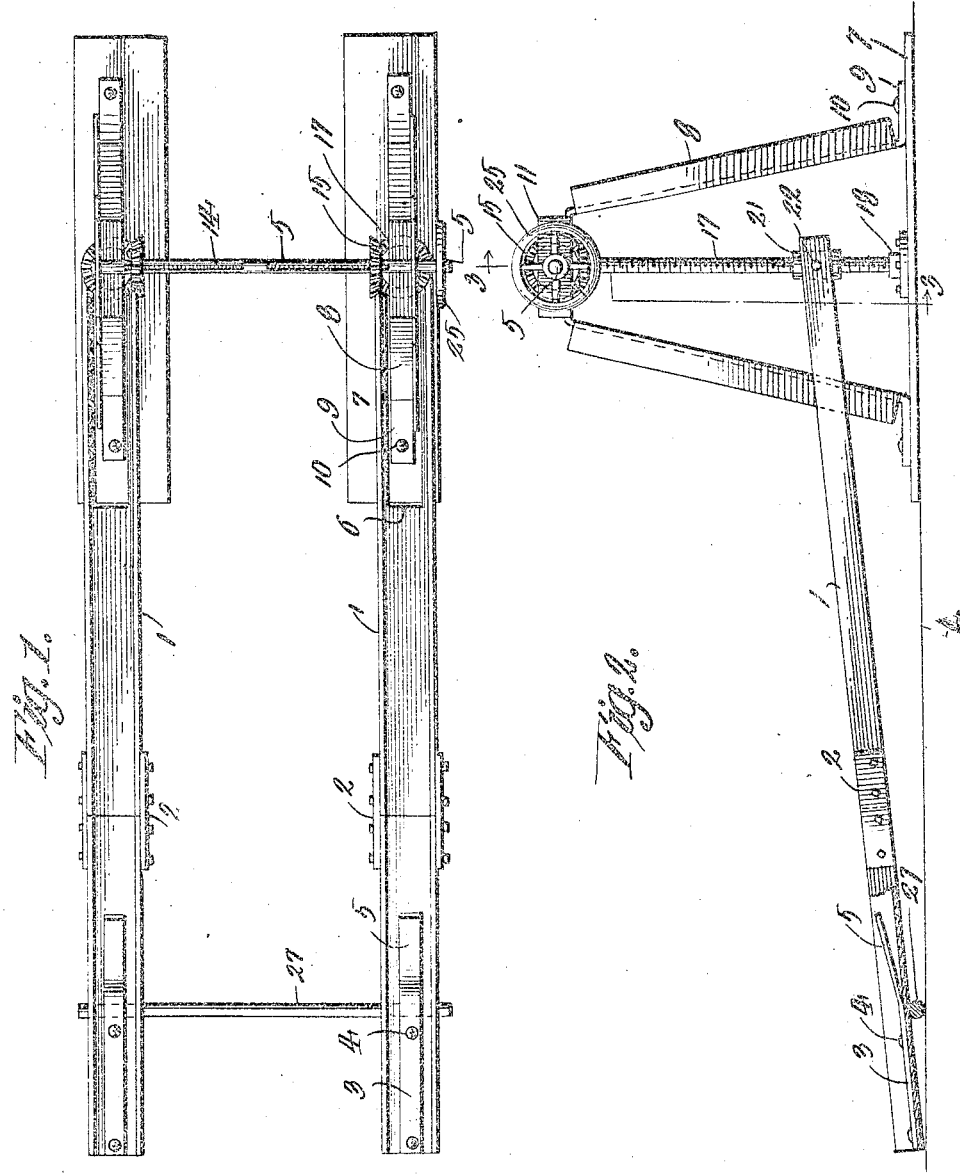

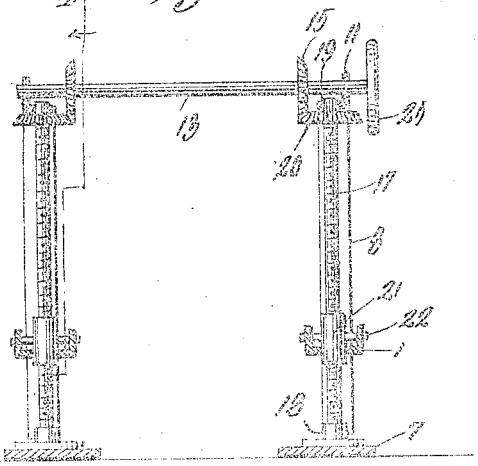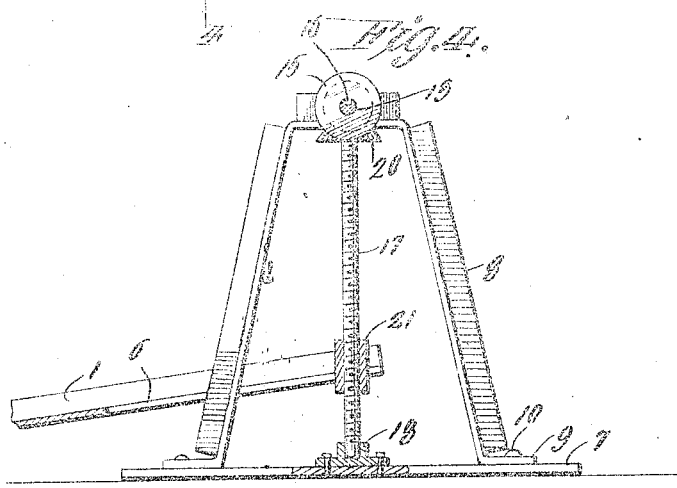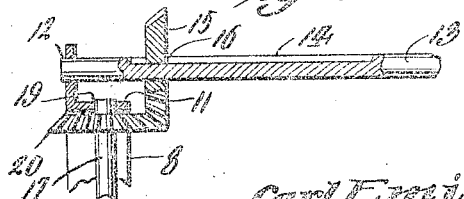

1,521,450

UNITED STATES PATENT OFFICE.

CARL EMIL LIEDBERG, OF CHICAGO, ILLINOIS.

AUTOMOBILE RACK.

Application filed June 9, 1924. Serial No. 718,969.

*To all whom it may concern:*

Be it known that I, CARL EMIL LIEDBERG, a citizen of the United States, residing at Chicago, in the county of Cook and State of Illinois, have invented certain new and useful Improvements in Automobile Racks, of which the following is a specification.

The present invention relates to improvements in adjustable automobile racks.

One of the important objects of the invention is to provide a rack suitable for use in automobile assembling plants, garages, automobile paint and repair shops, etc., which racks are so designed that the automobile or other vehicle may be readily run upon a platform carried by a jack for elevation purposes whereby the underneath portion of the automobile is rendered accessible.

Another important object of the invention is to provide a rack which may be utilized to lift vehicles of different sizes with reference to the length of the wheel base or the distance between the wheels or the gauge as it is commonly called of the automobile.

A still further important object of the invention is to generally improve upon racks of this nature by providing a very simple and efficient construction, one which is reliable in operation, inexpensive to manufacture, easy to handle, durable, strong, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is a top plan view of the rack embodying my invention,

Figure 2 is a side elevation thereof, a portion being shown in section,

Figure 3 is a vertical section taken substantially on the line 3—3 of Figure 2 looking in the direction of the arrows, Figure 4 is a vertical section taken substantially on the line 4—4 of Figure 3 looking in the direction of the arrow, and Figure 5 is a detail view taken substantially on the line 5—5 of Figure 1.

Referring to the drawing in detail it will be seen that the platform is formed by the two tracks 1 which are in the form of angle irons substantially U-shaped in cross section. Each of these tracks may be formed in two sections and held together by plates 2 riveted to their sides or if desired bolted thereto in order that they may be separated or connected together for shortening or lengthening the track. A chock 3 is situated at the free end of each track and consists of a spring plate riveted to the bottom of the track as at 4 and provided with the spring extension 5 which inclines upwardly from the bottom of the track toward the elevating end thereof which is that shown to the right in Figures 1 and 2 of the drawing. This elevating end of each track is slotted as is indicated at 6.

The jack utilized in conjunction with the platform consists of two uprights. Each upright includes a base 7 which is adapted to rest on the floor or the like and a standard indicated generally at 8. This standard 8 is of an inverted U-shaped formation preferably being formed of angle iron and the ends thereof terminate in the feet 9 which are fastened in any suitable manner as at 10 in the base 7. The flanges 11 of the intermediate or upper portion of the standards 8 are apertured as at 12 for the reception of a shaft 13 having a pair of keyways 14 therein one adjacent each end. A miter or beveled gear 15 is mounted at each end of the shaft 13 and its key 16 fits into the corresponding key way 14 so that this gear is rotatable with the shaft that may slide thereon. A threaded shaft 17 is mounted vertically its bottom end being disposed in a journal 18 on the base 7 and its upper end journaled in an opening 19 provided in the intermediate or upper portion of the standards 8. Beveled gears 20 are fixed to the upper ends of the shaft 17 for meshing with beveled gears 15. Blocks or nuts 21 are threaded on the shaft 17 and are constructed with pintles or trunnions 22 which are extended through the sides of the tracks 1. It is to be noted that one leg of each standard 8 extends through the slot 6 of the corresponding tracks. An operating wheel or crank 25 is mounted on one end of the operating shaft 13 so that upon rotation of this wheel the ends of the tracks 1 carried by the blocks 21 may be elevated. It is also to be noted that the bases and those elements carried thereby may be moved toward or away from each other depending upon the gauge of the automobile with which the rack is to be used and that the gears 15 will readily slide on shaft 13 to accommodate such an adjustment.

When the device is situated substantially as is illustrated in Figure 2 the automobile is run upon the platform consisting of tracks 1 until the rear wheels pass over the spring extensions 5 of the chock 3. The wheels or crank 25 is then turned to elevate the ends of the platform so that the underneath portions of the automobile are rendered accessible. I prefer to utilize a roller 27 underneath the free or lower ends of track 1 as when the other ends rise these ends will move and in order to not retard this movement a roller is utilized and thus the lifting power of the jack portion of the device is not retarded in any way by the free ends of the rails dragging.

Although I have described my invention with a certain degree of particularity, it is to be understood that changes in the details of construction and in the combination and arrangement of parts may be resorted to without departing from the scope or spirit of the invention as hereinafter claimed or sacrificing any of its advantages.

Having thus described my invention, what I claim as new is:

1. In combination, a pair of tracks, a jack at one end of each track, a shaft, a pair of beveled gears on the shaft rotatable therewith and slidable thereon for operating the jack so that said jacks may be moved toward or away from each other to vary the distance between the tracks.

2. In combination, a pair of tracks, a pair of jacks one associated with one end of each track and including a base, an inverted U-shaped standard on the base, a threaded shaft having one end journaled on the base and the other in the intermediate portion of the standard, said shaft being threaded, a block on said shaft, trunnions extending from said block and journaled in the corresponding track, a drive shaft, gears on the threaded shaft, gears on the drive shaft meshing with the first gear, said second gears being slidable on the drive shaft and rotatable therewith, and means for driving the drive shaft.

3. In combination, a pair of tracks, a jack associated with each track, a shaft, and means slidably mounted on the shaft and associated with the jacks to operate said jacks upon rotation of the shaft, said means being slidable so as to allow the distance between the tracks to be varied without operation of the jacks.

In testimony whereof I affix my signature in presence of two witnesses.

CARL EMIL LIEDBERG.

Witnesses:
  B. C. MILLER,
  A. BECKER.